June 20, 1939.　　A. J. BAAGOE　　2,163,183
WEIGHING APPARATUS
Filed Sept. 22, 1938　　2 Sheets-Sheet 1
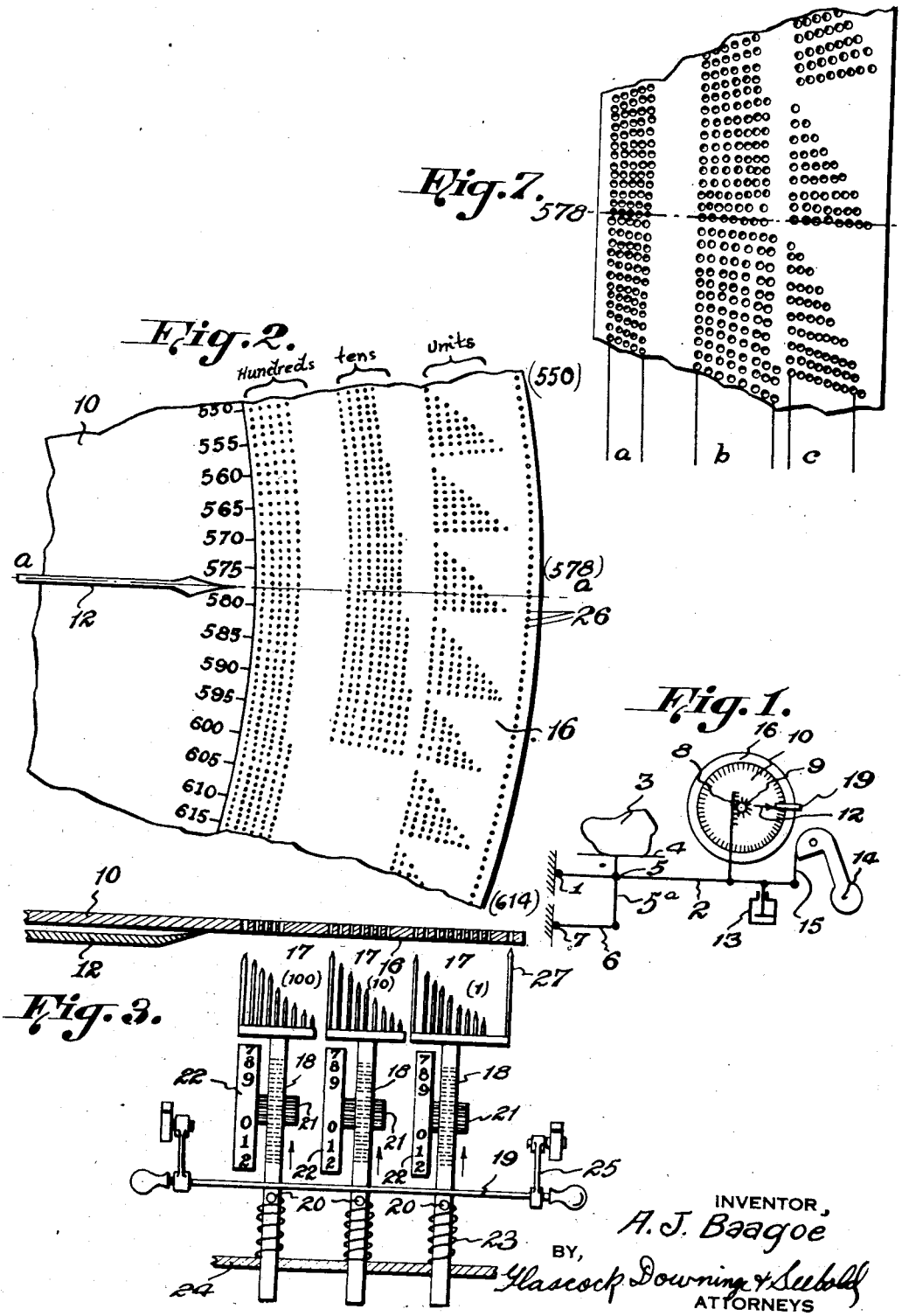
INVENTOR,
A. J. Baagoe
BY,
Glascock Downing & Seebold
ATTORNEYS June 20, 1939.  A. J. BAAGOE  2,163,183
WEIGHING APPARATUS
Filed Sept. 22, 1938   2 Sheets-Sheet 2
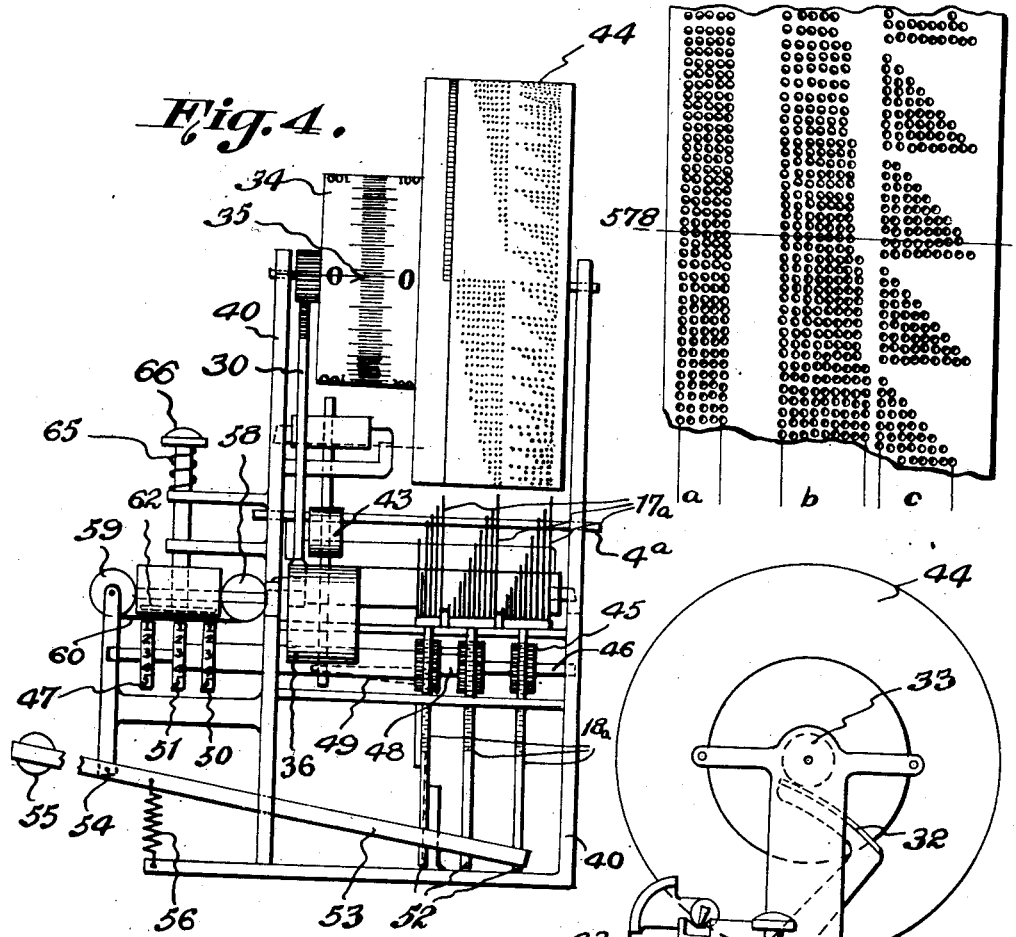
Fig. 4.
Fig. 6.
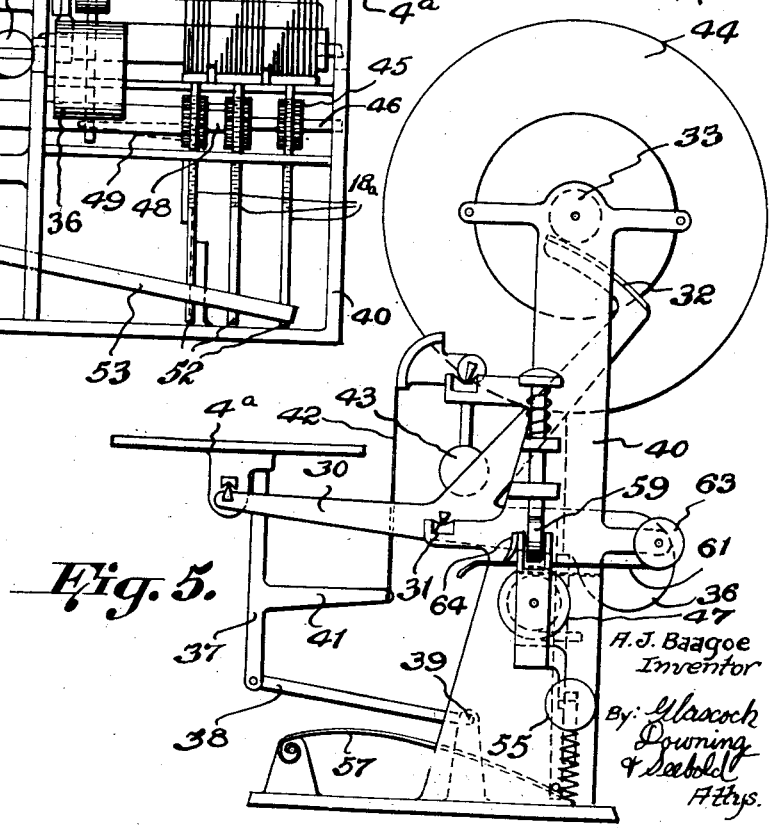
Fig. 5.
A. J. Baagoe
Inventor
By Glascock Downing & Seebold
Attys.

Patented June 20, 1939

2,163,183

UNITED STATES PATENT OFFICE 2,163,183

WEIGHING APPARATUS

Anthon Johannes Baagoe, Paris, France

Application September 22, 1938, Serial No. 231,247

7 Claims. (Cl. 116—129)

This application is a continuation in part of application No. 97,247, filed August 21, 1936.

This invention relates to weighing apparatus and has for its object to provide improved means for accurately and instantaneously setting indicating, printing and like means in dependence on the position of equilibrium of the weighing apparatus.

A further object is to provide an arrangement of this character in which feeler members are caused to cooperate with a perforated member to effect the setting of the indicating or printing means, one of said members being initially actuated by the weighing apparatus in degree proportional to the extent of movement of the weighing apparatus incident to a weighing operation.

In the accompanying drawings wherein several embodiments of the invention are illustrated:

Figure 1 is a diagrammatic view of a weighing apparatus illustrating the invention applied thereto.

Fig. 2 is an enlarged fragmentary front elevation of the pointer and dial showing the construction and arrangement of the perforated member, the feeler members and related parts being removed.

Fig. 3 is a sectional view taken radially through the dial and perforated member and showing the feeler members and printing or indicating means in top plan.

Fig. 4 is a front elevation of a modification of the invention.

Fig. 5 is a side view of Fig. 4.

Figs. 6 and 7 are enlarged detail views showing different forms of perforated members.

Referring to the drawings in detail, the numeral 1 indicates the fulcrum of a weighing beam 2 which is pivotally connected at 5 to a rod 5a supporting the weighing platform 4. The lower end of the rod 5a is pivotally connected to a link 6 which is pivoted at 7 to a suitable support adjacent the fulcrum 1 of the beam 2, the rod 5a and link 6 serving to maintain the weighing platform 4 in a horizontal position.

The end of the beam 2 opposite the fulcrum 1 is connected by a strap 15 with a pendulum weight 14 and a suitable type of check 13 for damping the oscillating movement of the beam 2 is connected therewith.

A rack 8 is also pivotally connected to the beam 2 and meshes with a pinion 9 fixed to the rotatable dial 10 having a graduated scale 11 inscribed thereon for cooperation with the stationary pointer 12 for indicating the weight of the article 3 placed upon the platform 4.

The dial 10 which in this form of the invention is in the shape of a disk, carries the perforated member 16. The dial is provided with 1000 graduations for weighing articles up to and including 1000 grams and the fragment thereof shown in Fig. 2 represents that part ranging from 550 to 614 grams.

The perforated member 16 is divided radially into three denominational zones indicated in Fig. 2 as hundreds, tens and units. The perforations in the member 16 are so arranged that in every position of the dial 10 a number of perforations corresponding to the number of units of weight indicated by the dial 10 is disposed in the position indicated by the broken line $a$—$a$ in Fig. 2.

Three feeler members $17_1$, $17_{10}$, and $17_{100}$ are arranged in front of the groups of units, tens and hundreds perforations in the disk 16 along the line $a$—$a$. Each feeler member includes a group of nine pins having pointed ends terminating in stepped relation and adapted to successively enter the perforations of the disk 16 which are presented thereto in the position of adjustment of the dial 10. Owing to the graduated length of the feeler pins the extent of movement of each feeler member varies in accordance with the number of perforations in the member 16 which are presented thereto, for instance, if no perforation is presented to the longest feeler pins, only negligible movement thereof may be effected whereas if nine perforations are presented to the feeler member, all nine of the feeler pins may enter therein and said feeler member may thereby perform a full stroke corresponding to the value "9".

The feeler members 17 to $17_{100}$ are attached to rectangular bars 18 which are suitably mounted for longitudinal sliding movement. The under sides of the bars 18 are provided with teeth meshing with pinions 21 to which numeral wheels 22 are secured. The numeral wheels 22 are provided on the circumference thereof with numerals ranging from 0 to 9 which may be arranged for visible inspection or may be in the form of printing type for printing purposes.

The bars 18 together with the related feeler members 17 are normally urged toward the perforated member 16 by springs 23 arranged between the suitable abutment 24 and pins 28 fixed to the bars 18. The bars 18 are held in retracted position against the tension of the springs 23 by a stop bar 19 pivotally supported by arms 25 whereby the bar may be raised to disengage it from the pins 20 and thereby permit the feeler members to move toward the perforated member 16 under the influence of the springs 23.

Assuming that an article 3 weighing 578 grams is placed on the platform 4, when the weighing apparatus arrives at the equilibrium position, the pointer 12 will indicate that value on the dial 10 and five of the hundreds perforations will be presented to the feeler member 17₁₀₀, seven of the tens perforations will be presented to the feeler members 17₁₀ and eight perforations of the units group will be presented to the feeler member 17₁. The retaining bar 19 is then swung to inoperative position and the bars 18 together with the associated feeler members are moved toward the perforated member 16 under the influence of the springs 23. This movement of the feeler members is transmitted to the numeral wheels 22 by the toothed connection between the bars 18 and the pinions 21 and the several numeral wheels, from left to right are moved to such extent as to indicate respectively, the values "5", "7" and "8".

The perforated member 16 is provided with an additional set of perforations 26, one located at every position of the dial 10. These perforations 26 are of conical form and are arranged with the large ends thereof adjacent a positioning pin 27 attached to the unit feeler member 17₁. The pin 27 is of greater length than those of the feeler members 17 and consequently it enters one of the perforations 26 in advance of the penetration by the pins of the feeler members 17 and thereby initially positions the perforated member 16 in accurate registration with the pins.

In the modification of the invention illustrated in Figures 4 and 5 the platform 4a supported by a lever 30 which is mounted to turn about a fulcrum 31 and is provided at the end opposite the fulcrum with a gear segment 32 meshing with a pinion 33. The pinion 33 is fixed to the cylindrical dial 34 cooperating with the fixed pointer 35.

The lever 30 is provided with a counterweight 36 and the fulcrum 4a is connected by a rod 37 with a link 38 pivoted at 39. The cylindrical dial 34, lever 30 and link 39 are mounted for turning movement in a suitable frame 40. The rod 37 is provided with an arm 41 connected by a flexible strip 42 with the pendulum weight 43.

In this embodiment of the invention the perforated member 44 is cylindrical in form and the hundreds, tens and units perforations are formed in the circumference thereof. Three feeler members 17a provided with a group of pointed pins as above described in connection with Figs. 1 to 3 are arranged below the perforated member 44. Each feeler member 17a is attached to a bar 18a mounted for vertical movement in the frame 40 and provided with rack teeth engaging pinions 45.

The pinion 45 cooperating with the units feeler member is fixed to a shaft 46 journaled in the frame 40 and provided at its opposite end with a numeral wheel 47. The pinions 45 cooperating with the tens, hundreds feeler members 17a are fixed to tubular shafts 48 and 49 arranged for relative rotation upon the shaft 46 and respectively provided with numeral wheels 50 and 51. Each of the bars 18a is subjected to the tension of a spring 57 whereby the several bars together with the feeler members carried thereby are normally urged upwardly. The lower extremities of the bars 18a are provided with pins 52 which are engaged by one end of a retracting lever 53 pivotally mounted at 54 in the frame 40 and provided with a handle 55 for manual operation. The lever 53 is actuated by a spring 56 the tension of which is sufficient to overcome the combined tension of the several springs 57 and thereby maintain the several feeler members 17a in inoperative position.

The numeral wheels 47, 50 and 51 are provided with peripheral printing type which are set in dependence upon the position of the feeler members 17a. Rollers 58 and 59 are journaled in the frame 40 and support a carbon strip 60 for making a legible impression upon the paper strip 61 on depression of the stamp 62. The paper strip 61 is wound on the roller 63 supported in the machine frame and extending across the carbon strip 60 and a cutting blade 64 is provided for severing a part of the strip 61 after an impression has been made thereon. The stamp 62 is normally held in elevated inoperative position by spring 65 cooperating with a manually operable handle 66 mounted for vertical sliding movement in the frame 40.

In operation, the weight of the article placed on the platform 4a causes displacement of the dial 34 together with the perforated member 44 to a position corresponding to the units of weight. When the weighing mechanism attains its position of equilibrium, the handle 55 is depressed thereby releasing the bars 18a and permitting the feeler members to move upwardly to an extent depending upon the number of perforations in the member 44 which are presented to the several groups of pins. The movement of the bars 18a is transmitted to the pinions 45 which turn the number wheels 47, 50 and 51 to positions in which the number types corresponding to the value of the weight units of the article placed on the platform 4a are disposed immediately under the paper strip 61. While still retaining the handle 55 in depressed position, the handle 66 is depressed against the tension of the spring 65 and the pressure exerted by the stamp 62 produces an impression of the type of the wheels 47, 50 and 51 through the medium of the carbon strip 60. After the release of the handle 66 the handle 55 is also released and the tension of the spring 56 restores the rods 18a, feel members 17a and numeral wheels 47, 50 and 51 to their original position.

Although it is assumed in the above description that the feeler members move at right angles to the surface of the perforated member, it will be understood that the angular relation may be varied and it is also possible that the several feeler members may be displaced in relation to each other or disposed at an inclination, that is to say, along the line of a helix of the perforated member.

The division of the perforations into groups and the location of these into perforated members is shown on an enlarged scale in Figs. 6 and 7, the latter figure showing the perforated member in the form of a section of a cone.

What I claim is:

1. In a weighing apparatus, a perforated member movable in degree proportional to the setting of the weighing apparatus, independently displaceable feeler members, said perforated member having perforations therein arranged in groups of different denominational values adapted to be presented to said feeler members during movement of the perforated member, the number of perforations of the several groups presented to said feeler members, in every position of the perforated member corresponding to the number of units of weight of the goods being weighed, each of said feeler members including a group of pins corresponding to each group of perforations and adapted during displacement to penetrate said perforations to a degree proportional to the number of perforations presented thereto.

2. A weighing apparatus as claimed in claim 1 characterized by the provision of means carried by one of said feeler members for engaging and positioning the perforated member, prior to engagement of the pins therewith.

3. Weighing apparatus as claimed in claim 1, characterized in that said perforated member is of substantial disk-like form.

4. Weighing apparatus as claimed in claim 1, characterized in that said movable member is of substantially cylindrical form.

5. Weighing apparatus as claimed in claim 1 characterized in that said perforated member is substantially conical in form.

6. Weighing apparatus as claimed in claim 1, characterized in that the pins of each feeler member terminate in step-like manner whereby during displacement they successively enter the perforations of the perforated member presented thereto.

7. Weighing apparatus as claimed in claim 1, characterized by the provision of a movable member associated with each feeler member for affording an indication of the position thereof, and means for moving said movable member in degree proportional to the extent of movement of the associated feeler member.

ANTHON JOHANNES BAAGOE.